(Model.)

2 Sheets—Sheet 1.

H. ADKINS.
HORSE POWER.

No. 298,932. Patented May 20, 1884.

WITNESSES:
C. Neveux
C. Sedgwick

INVENTOR:
H. Adkins
BY
ATTORNEYS.

(Model.)

H. ADKINS.
HORSE POWER.

No. 298,932.

2 Sheets—Sheet 2.

Patented May 20, 1884.

WITNESSES:
C. Neveux
C. Sedgwick

INVENTOR:
H. Adkins
BY
ATTORNEYS.

UNITED STATES PATENT OFFICE.

HOMER ADKINS, OF CONCORDIA, KANSAS.

HORSE-POWER.

SPECIFICATION forming part of Letters Patent No. 298,932, dated May 20, 1884.

Application filed October 27, 1883. (Model.)

*To all whom it may concern:*

Be it known that I, HOMER ADKINS, of Concordia, in the county of Cloud and State of Kansas, have invented certain new and useful Improvements in Horse-Powers, of which the following is a full, clear, and exact description.

This invention relates to that description of horse-powers in which the draft-animals travel within the rim of a horizontal drive-wheel that is supported so that it can be tipped or tilted to provide for the animals stepping into their places in the wheel, said horse-powers being mainly designed for use in places where available room is restricted.

The invention consists in a balanced tipping or tilting horizontal driving-wheel of novel construction, having its whole support below, and in means for tipping or tilting the same and in making it run steady, whereby increased facility is afforded for erecting and removing the wheel from place to place when required. Lightness is combined with strength, and an easy and steady motion with but little friction, and an increased driving effect for the power applied is obtained.

Reference is to be had to the accompanying drawings, forming part of this specification, in which similar letters of reference indicate corresponding parts in all the figures.

Figure 1:
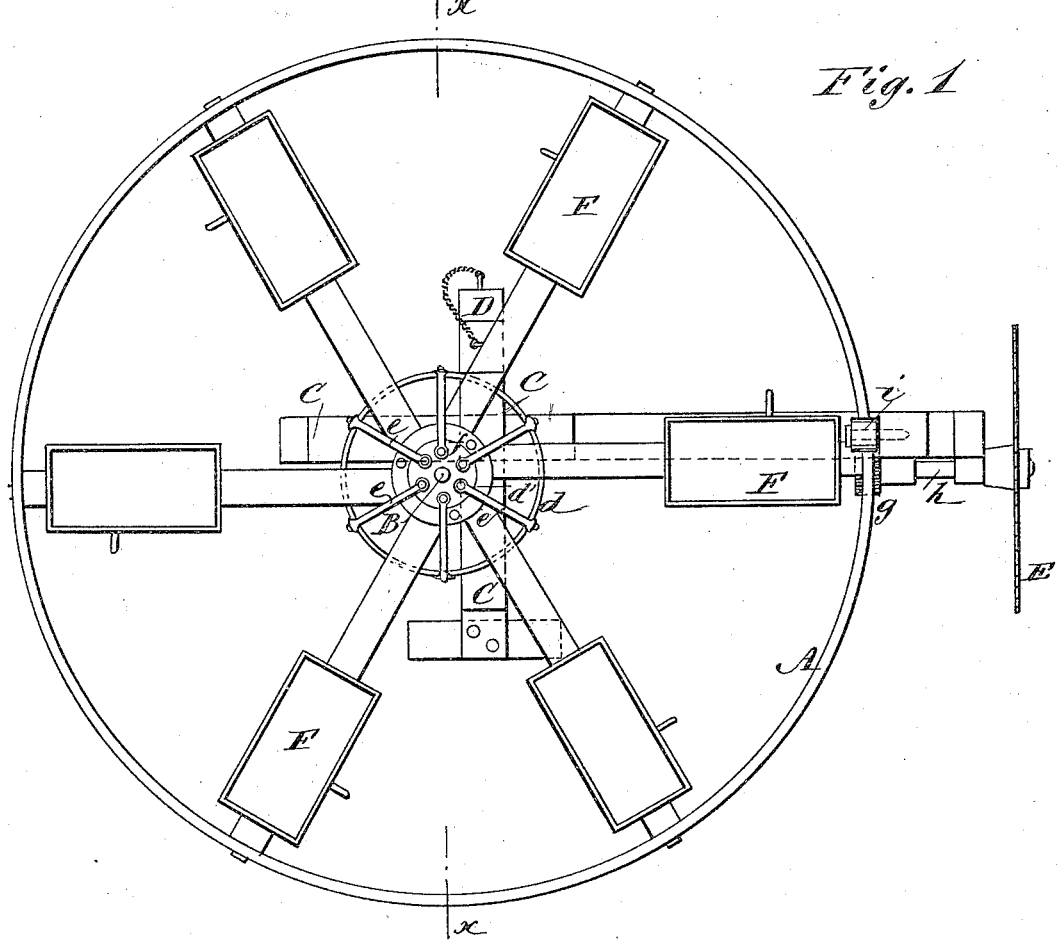
Figure 2:
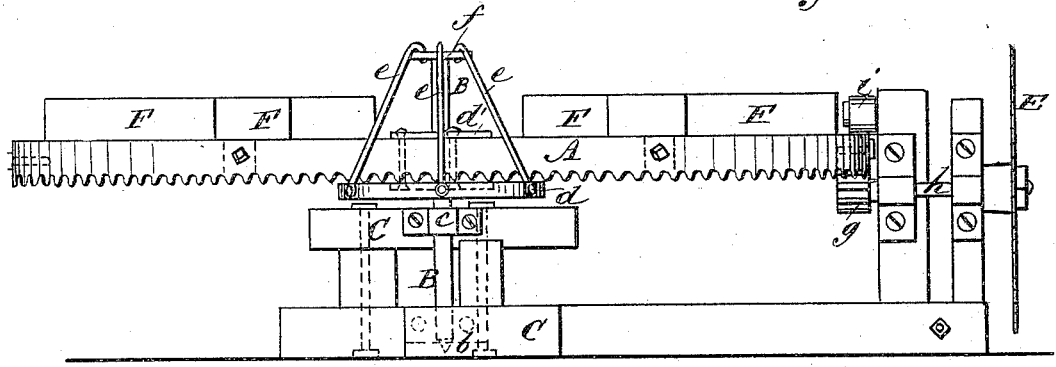
Figure 3:
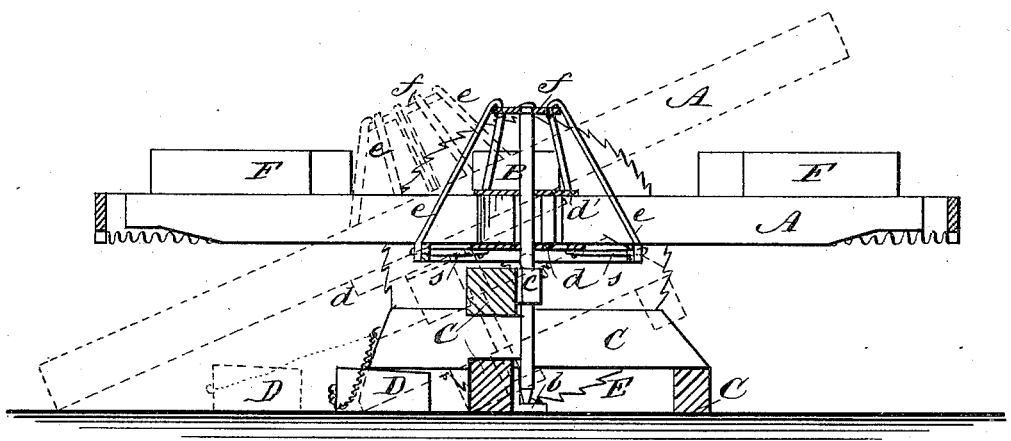

Figure 1 represents a plan of a horse-power embodying my invention. Fig. 2 is a side view of the same, and Fig. 3 is a vertical transverse section thereof on the line $x\ x$ in Fig. 1.

A is the horizontal driving-wheel, which has no frame or timber over it to carry it, but is exclusively supported below by its center shaft, B. This shaft, which is a stout one, and may be five feet long, more or less, and run in an oil-cup box or step-bearing, $b$, at its base, and also in or through an upper box, $c$, to hold it to the base-supporting frame C, is secured to the hub of the wheel. Said hub consists of two circular steel or other plates, $d\ d'$, arranged at suitable distances apart one above the other, and made to slip or fit over the shaft B, to which they are keyed. The lower one, $d$, of these plates, which may consist of a ring united by braces $s$ with a solid center, and which is larger than the upper plate, $d'$, that is on top of the wheel, has a series of upwardly inclining and concentrating braces, $e$, arranged around it and connected at their upper ends with a small plate, $f$, on top of the shaft B. This construction makes a light but stout hub to carry the wheel, and provides for the arms of the wheel A being readily taken out without removing a bolt or brace and being replaced when required, the rim of said wheel also being constructed in sections, to provide for the ready portability of the horse-power from place to place. The lower supporting-frame, C, is a short but stout one, to keep the wheel from jarring, and is designed to rest loosely on the ground or floor, without stakes or other fastenings to secure it, thus doing away with any permanent attachment and stakes to hold it, that in frosty weather are very objectionable, and providing for an easy tipping or tilting of the wheel A and the whole structure to one side, as shown by dotted lines in Fig. 3, by simply withdrawing an attached supporting-wedge, D, from under the one side of the supporting-frame C when it is required to introduce the draft-animals into the wheel by their either stepping over the lowered portion of the rim of the wheel or passing beneath the raised side thereof without any liability to injury of them. The wheel A is afterward returned to place, and supported by the wedge D in its horizontal position, and the animals attached to it by any suitable draft devices. Said wheel is similarly tipped when it is required to remove the draft-animals.

The power may be transmitted from the wheel A without speeding-up gearing, from cogs on the edge of the rim of the wheel meshing into a pinion, $g$, upon a radial shaft, $h$, carried by an extension of the main frame, which shaft, here shown as carrying a circular saw, E, may be used for any purpose required, and a roller, $i$, connected with the frame, be arranged to run on the upper or opposite edge of the rim of the wheel A to steady the gear; or, for light work, the power may be transmitted by a band from the rim of said driving-wheel.

The wheel A, as hereinbefore observed, is a balance one, and, to make it run easy and steady, should either be of heavy construction or be weighted; but it is preferred to have it of a light construction and to provide it with adjustable or removable weights—as, for instance, with bags or sacks of shot or other weights placed within receptacles F on the arms of the wheel, and whereby a very accurate balancing action may be obtained. All the power exerted by the draft-animals will be utilized on the weighty or weighted balance-wheel A, which will run exceedingly easy and steady.

The speed of the wheel A may be increased or diminished by hitching the draft-animals nearer to or farther from its center, and said wheel may be of any desired size, and any number of horses or draft-animals be introduced to work it, two sufficing to operate a corn-sheller and many other agricultural machines.

Having thus described my invention, I claim as new and desire to secure by Letters Patent—

1. In horizontal-wheel horse-powers capable of being laterally tipped or tilted to provide for the entry and removal of the draft-animals within and from the wheel, the combination of the balance-wheel A and its shaft B with the tipping or tilting lower supporting-frame, C, substantially as specified.

2. The horizontal balanced wheel A, having its hub constructed of plates $d\ d'\ f$ and braces $e\ s$, arranged in relation to the wheel and its shaft B essentially as shown and described.

3. The combination of the wedge or shifting prop D with the lower supporting-frame, C, and the wheel A, arranged to tip or tilt laterally along with said frame, substantially as and for the purposes herein described.

4. In horizontal-wheel horse-powers capable of being laterally tipped or tilted, as described, the combination, with the tipping or tilting lower supporting-frame, C, of the shaft B and the balanced wheel A, provided with weight-holding receptacles F, to steady the run of the wheel, essentially as specified.

HOMER ADKINS.

Witnesses:
　GARRET M. SHAFFER,
　J. E. BURRUS.